(12) United States Patent
Hara et al.

(10) Patent No.: US 7,597,737 B2
(45) Date of Patent: Oct. 6, 2009

(54) METHOD FOR PRODUCING STEEL INGOT

(75) Inventors: Ken-ichiro Hara, Myrtle Beach, SC (US); Hidemi Takao, Matsue (JP); Setsuo Mishima, Matsue (JP); Etsuo Fujita, Meerbusch (DE)

(73) Assignee: Hitachi Metals, Ltd., Tokyo (JP)

( * ) Notice: Subject to any disclaimer, the term of this patent is extended or adjusted under 35 U.S.C. 154(b) by 248 days.

(21) Appl. No.: 10/574,839

(22) PCT Filed: Apr. 30, 2004

(86) PCT No.: PCT/JP2004/006287

§ 371 (c)(1),
(2), (4) Date: Nov. 2, 2006

(87) PCT Pub. No.: WO2005/035798

PCT Pub. Date: Apr. 21, 2005

(65) Prior Publication Data

US 2007/0039418 A1    Feb. 22, 2007

(30) Foreign Application Priority Data

Oct. 8, 2003    (JP) ............... 2003-349559

(51) Int. Cl.
*C21C 7/10* (2006.01)
*C22B 9/04* (2006.01)
*C22B 9/16* (2006.01)

(52) U.S. Cl. ............... 75/10.64; 75/568; 75/508

(58) Field of Classification Search ............ 75/508, 75/568, 10.64

See application file for complete search history.

(56) References Cited

U.S. PATENT DOCUMENTS

| | | | |
|---|---|---|---|
| 3,235,373 A * | 2/1966 | Perry et al. | 75/10.23 |
| 3,687,187 A * | 8/1972 | Tommaney et al. | 75/10.23 |
| 3,764,297 A * | 10/1973 | Coad et al. | 75/10.23 |
| 4,294,611 A | 10/1981 | Tamas et al. | |
| 4,871,511 A * | 10/1989 | Smith et al. | 420/96 |
| 5,133,812 A * | 7/1992 | Kelly et al. | 148/528 |
| 6,358,299 B1 | 3/2002 | Wei | |
| 6,585,799 B1 * | 7/2003 | Zeze et al. | 75/568 |
| 7,445,678 B2 * | 11/2008 | Mishima et al. | 148/221 |

FOREIGN PATENT DOCUMENTS

| | | |
|---|---|---|
| CN | 1165871 A | 11/1997 |
| EP | 1 331 278 A1 | 7/2003 |
| EP | 1 422 301 A1 | 5/2004 |
| GB | 2 043 113 A | 10/1980 |
| JP | 55-028384 | 2/1980 |
| JP | 55-091923 A | 7/1980 |
| JP | 04-002745 | 1/1992 |
| JP | 05-186813 | 7/1993 |
| JP | 05-186813 A | 7/1993 |
| JP | 05186813 A * | 7/1993 |
| JP | 11-293407 | 10/1999 |
| JP | 11-293407 A | 10/1999 |
| JP | 2000-297353 | 10/2000 |
| JP | 2001-214212 A | 8/2001 |
| JP | 2002-161309 | 6/2002 |
| JP | 2002-161309 A | 6/2002 |
| JP | 2003-183765 | 7/2003 |
| JP | 2003-183765 A | 7/2003 |

OTHER PUBLICATIONS

Machine translation of JP 05-186813 A, Jul. 1993.*
Machine translation of JP 05-186813 A published Jul. 1993.*
International Preliminary Report on Patent Ability issued in PCT/JP2004/006287; dated Apr. 20, and Jul. 6, 2006.

* cited by examiner

*Primary Examiner*—Roy King
*Assistant Examiner*—Tima M McGuthry-Banks
(74) *Attorney, Agent, or Firm*—Sughrue Mion, PLLC (57) ABSTRACT

A method for producing a steel ingot, which comprises an Mg oxide forming step of preparing a molten steel containing Mg in an amount sufficient for the molten steel to have an oxide composition having MgO as a primary component and a dissociation step of keeping the pressure of the atmosphere around the molten steel to be lower than that in the Mg oxide forming step, to thereby dissociate MgO to Mg and oxygen and reduce the content of Mg in the steel to 50% or less of that in the Mg oxide forming step through the diffusion thereof into a gas phase. A preferred method further involves a solidifying step.

15 Claims, 9 Drawing Sheets

METHOD FOR PRODUCING STEEL INGOT

TECHNICAL FIELD

The present invention relates to a method for producing a steel ingot consisting of a metal material containing Fe as a primary component (i.e. Fe is of a maximum content component of the metal material.), and more particularly to a method for producing a steel ingot, by which non-metallic inclusions (herein below merely referred to as inclusions) can be very finely controlled.

BACKGROUND ART

Inclusions present in steel have an influence on various mechanical properties. For example, in the case where a steel sheet is blanked or punched out by press working or cut, there has been a technique of causing inclusions to finely disperse in order to improve blanking and cutting properties by means of the inclusions serving as initiation points of fracture.

On the other hand, it has been known also that the inclusions in steel adversely affect mechanical properties of the steel depending on chemical compositions, shapes and/or sizes thereof. With regard to a steel material which is required to have good fatigue strength, for example, there is a problem of fracture due to inclusions as an initiation point is problematic in use in which fatigue strength is required. A size of inclusions has a great influence on such fatigue fracture, and control of the inclusions present an important problem.

As a method of controlling inclusions in higher grade materials used for special applications such as automobile components, tool steel, structural steel, etc., two melting steps have been commonly performed, which consist of, for example, a first step of melting in an arc furnace (herein below referred to as AF) or vacuum induction melting (herein below referred to as VIM), and a second step of electroslag remelting (herein below referred to as ESR) or vacuum arc remelting (herein below referred to as VAR).

Steel produced through such two melting steps with use of VAR or ESR has an advantage that it is homogeneous (less component segregation) and contains a small amount of inclusions.

Maraging steel is a typical steel which is strictly required to overcome the problem of fatigue fracture due to inclusions.

Since the maraging steel has high toughness and high strength, it is used for structural members, on which a reiterative stress is exerted, and for important members which are required to have a high fatigue strength. However, it has been widely known that when a large-sized non-metallic inclusions are contained in such a member, fatigue fracture is liable to occur because the inclusions serve as initiation points of fracture. Thus, it is needed to finely disperse the non-metallic inclusions especially in order to prevent occurrence of high-cycle fatigue fracture.

In order to overcome the inclusion problem, there have been proposed various ideas of making inclusions fine. Such proposals can be seen from, for example, JP-A-11-293407 and JP-A-2003-183765 which were filed by the present applicant.

DISCLOSURE OF THE INVENTION

In order to make inclusions in a steel ingot fine, conventionally it has been tried to decrease amounts of inclusion forming elements such as oxygen, nitrogen, etc., or to adjust parameters of remelting conditions.

However, there is a limitation in reduction in oxygen and nitrogen due to restrictions by the component standard specifications, that is, that restriction of an addition of deoxidizing elements such as C, Al, etc., which is established by the component standard specifications, and in modification of parameters, such as controlling a melting rate, a degree of vacuum of an atmosphere, etc., which are directly related to a volume of production, in terms of mass-productiveness. Therefore, a new technique of making inclusions fine, which method is actually suited to a mass production step, has been desired earnestly.

It is an object of the invention to provide a method for producing a steel ingot, by which method inclusions can be made significantly fine as compared with the prior art.

The present inventors have found that it is possible to obtain a steel ingot containing fine inclusions by the steps of providing Mg in molten steel to form oxides a primary component of which is MgO, and exposing the molten steel to higher vacuum, whereby promoting a dissociation reaction of the oxides consisting primarily of MgO at the surface of the molten steel.

Thus, the invention is directed to a method for producing a steel ingot, which comprises the steps of:

forming a magnesium oxide, in which molten steel is adjusted to contain a sufficient amount of Mg to make oxides admixed in the molten steel so as to have a chemical composition a primary component of which is MgO; and dissociating the magnesium oxide contained in the molten metal into Mg and oxygen by making a degree of vacuum of the melting environment higher than that of the former process of forming a magnesium oxide whereby making a Mg content in the molten steel to be not more than 50% of that in the former process of forming a magnesium oxide.

Herein, the terminology of "oxides a primary component of which is MgO" means those in which MgO is a maximum amount component as compared with the remainder oxide components.

Also, the Mg content in the dissociating process is preferably not more than 20%, more preferably not more than 10%, of that in the magnesium oxide forming process.

Also, in the invention, it is preferable to cast the molten steel in the magnesium oxide forming process after adjusting it to contain a sufficient amount of Mg to make oxides admixed in the molten steel so as to have a chemical composition a primary component of which is MgO, wherein the magnesium oxide forming process is referred to as "a primary melting process", and to subsequently carry out the process of dissociating the magnesium oxide by remelting the cast steel under a degree of vacuum higher than that of the primary melting process, whereby dissociating the magnesium oxide contained in the molten metal into Mg and oxygen thereby making a Mg content in the molten steel to be not more than 50% of that in the primary melting process.

Especially, preferably a steel containing a nitride forming element as a component of an ingot is produced by the method in which the remelting process is carried out.

In the invention, preferably, the degree of vacuum in the magnesium oxide forming step is 6 kPa to 60 kPa and the degree of vacuum in the process of dissociating the magnesium oxide is decreased relative to 0.6 kPa.

Also, it is desired in the invention that the relationship between an amount of Mg ($Mg_{OXI}$) and an amount of Al ($Al_{OXI}$) be adjusted in the magnesium oxide forming step so as to satisfy the following equation:

$$Al_{OXI}(\text{mass ppm})/Mg_{OXI}(\text{mass ppm})=5 \text{ to } 100.$$

Here, it is possible to carry out the magnesium-oxide forming process and the process of dissociating a magnesium-oxide by controlling an ambient melting atmosphere only relying on the primary melting process while omitting the remelting process. In such a case, an amount of Mg ($Mg_{OX1}$) and an amount of Al ($Al_{OX1}$) in the magnesium-oxide forming process indicate, respectively, a Mg content and an Al content in samples collected at a point of time immediately before the degree of vacuum is increased to cause the magnesium-oxide forming process to transit to the process of dissociating a magnesium-oxide.

Also, in the case where the primary melting is effected in the magnesium oxide forming process and remelting is effected in the process of dissociating the magnesium oxide, an amount of Mg ($Mg_{OX1}$) indicates a Mg content in a steel ingot cast after the primary melting.

In the invention, desirably Mg is added into the molten steel as a Ni—Mg alloy which contains from exclusive zero to not more than 20 mass % of Mg.

Also, in the invention, desirably the steel ingot contains 0.01 to 6 mass % of Al, and also preferably it contains 0.1 to 2 mass % of Ti.

Specifically, the invention method may be applied to obtaining, for example, maraging steel, tool steel such as steel for metal molds, etc.

Desirably, the maraging steel consists essentially of, by mass, less than 10 ppm of O (oxygen), less than 15 ppm of N (nitrogen), not more than 0.01% C, 0.3 to 2.0% or less of Ti, 8.0 to 22.0% of Ni, 5.0 to 20.0% of Co, 2.0 to 9.0% of Mo, 0.01 to 1.7% of Al, and the balancer of Fe and unavoidable impurities The method for producing a steel ingot, according to the invention, provides a technology, which is capable of greatly decreasing a magnitude of non-metallic inclusions through the medium of addition of Mg and control of a specific pressure reducing step and very useful to an improvement in mechanical properties such as toughness and fatigue strength, on which coarse inclusions have adverse affect, and an improvement in a surface state with regard to generation of flaws attributable to inclusions in mirror finish.

Herein below there will be provided a description of features of the invention.

Taking notice of the fact that Mg having an oxide forming ability brings about a high vapor pressure in a vacuum, the inventors of the present application have studied influences of Mg on inclusions in steel. Then the inventors have found that by once forming the oxides a primary component of which is MgO and exposing the oxide to a high vacuum, evaporation of Mg from a surface of a molten steel makes it possible to dissociate and lose most of the oxides a primary component of which is MgO, thus enabling greatly decreasing a magnitude of inclusions in a steel ingot after solidification.

The reason for this is thought to be as follows.

The oxides a primary component of which is MgO are higher in oxide forming ability than oxides a primary component of which is $Al_2O_3$ being known to be a typical inclusion in steel, and when an appropriate amount of a Mg alloy is added into a molten steel, the oxides a primary component of which is MgO will be diffused in the molten steel to be present therein. When casting is made as it is after addition of Mg, inclusions are only changed into the oxides a primary component of which is MgO from oxides a primary component of which is $Al_2O_3$, and so any dramatic effect of making inclusions fine is not obtained.

Hereupon, a process of dissociating the magnesium oxide, in which an atmosphere is smaller in degree of vacuum than a step of forming oxides a primary component of which is MgO, is given. Being exposed to a high vacuum, Mg in a molten steel of a high vapor pressure diffuses in a gas phase, so that an equilibrium state in the molten steel is lost and dissociation of the oxides a primary component of which is MgO proceeds. At this time, the dissociated oxygen is combined with Mg, Al, etc. in the molten steel to form oxides a primary component of which is MgO and oxides a primary component of which is $Al_2O_3$ but diffusion of oxygen depends upon the proceeding of dissociation reaction, and so it is believed that rapid growth of an oxide is not resulted and solidification is brought about with an oxide being fine, thus enabling forming a steel ingot.

In contrast, with conventional manufacturing methods, inclusions, such as $Al_2O_3$, which are liable to agglomerate, are inherently present in a molten steel and collides against one another due to movement in the molten steel to grow gradually into large-sized inclusions.

According to the invention, inclusions, such as $Al_2O_3$, etc., which are liable to agglomarate, are made to be the oxides a primary component of which is MgO in the magnesium oxide forming process to prevent agglomeration and growth caused due to collision, and the oxides a primary component of which is MgO is dissociated into oxygen and Mg gases in the process of dissociating the magnesium oxide so that an oxide in a steel ingot after solidification is made fine.

In the invention, there is a need for adjustment to a molten steel, in which Mg of a sufficient amount to make oxides a primary component of which is MgO a main inclusion is present in a molten metal.

An amount of a Mg alloy being added can be calculated as a sufficient amount to form oxides a primary component of which is MgO in a chemical equilibrium manner from an amount of an active element such as Al, etc., an amount of oxygen, and an amount of sulfur (S) in a molten metal.

Simply, for a specific kind of steel, it suffices to collect samples after addition of Mg in repeated experiments and to examine and determine an amount of Mg being added and the composition of oxides in the samples in a state of solidification. Preferably, in order to prevent loss of Mg when additioning, Mg is added in the form of an alloy consisting of Mg and another alloying element(s) of steel, for example, a Ni—Mg alloy which contains from exclusive zero to not more than 20 mass % of Mg.

In the invention, a Mg content is made equal to or less than 50% of that in the magnesium oxide forming process. This is because the value is determined as an empirical one, and in the case where inclusions in a molten steel is made oxides a primary component of which is MgO after the addition of Mg, addition of Mg, an amount of which is twice a target value or more, can produce a definite effect in making inclusions in a steel ingot solidified after the process of dissociating the magnesium oxide fine even when a Mg content demanded of a steel ingot is in the order of 3 to 5 ppm or less, which has no influence on steel.

In the case where a Mg content, in the process of dissociating the magnesium oxide, exceeding 50% of that in the magnesium oxide forming process remains, dissociation of Mg is insufficient and so the effect, by dissociation, of making an oxide fine cannot be obtained sufficiently. A Mg content is preferably equal to or less than 20% of a Mg content in the magnesium oxide forming process, more preferably equal to or less than 10% thereof.

In addition, since introduction of excessive Mg affects main properties, such as mechanical strength, etc., of steel, an amount of Mg is preferably made necessity minimum. Also, in the process of dissociating the magnesium oxide, in which pressure reduction and remelting are made, the dissociation reaction is hard to proceed in a state, in which Mg gases of a large amount are present in the ambient atmosphere.

Therefore, desirably, a Mg content in steel, for example, in a process of forming oxides a primary component of which is MgO is around 300 ppm at the maximum and actually around 10 to 200 ppm.

Herein, the terminology of "a primary component of MgO" means such a case that when the chemical composition of the oxides is analyzed by, for example, a X-ray analyzer, elements except oxygen are put to quantitative analysis and not less than 30 mass % Mg is detected.

In this case, the analysis can be confirmed by performing qualitative/quantitative analysis with, for example, an energy distributed type X-ray analyzer.

Also, in examining a ratio of inclusions mainly composed of MgO, the ratio can be found by extracting inclusions in a sample having a specific weight and putting them to qualitative/quantitative analysis with, for example, an energy distributed type X-ray analyzer.

According to the invention, the method of the invention can be applied not through steps of primary melting and remelting if an ambient atmosphere of a molten metal can be flexibly controlled, but it is not easy to control pressure of an ambient atmosphere and so it is practical to once achieve solidification through a primary melting such as vacuum induction melting at a low vacuum, or the like and to then combine the same with remelting such as vacuum arc remelting (VAR), etc. in the process of dissociating the magnesium oxide.

Specifically, the vacuum arc remelting (VAR) is convenient in suppressing growth of other inclusions in a high vacuum and in a small unit of solidification in the process of dissociating the magnesium oxide. Further, VAR is effective in suppression of segregation and reduction of gas components such as oxygen, etc.

According to the invention, in addition to the effect of making an oxide fine, an effect of preventing a nitride from becoming coarse can be produced on a steel ingot containing a nitride forming element such as Ti, etc. in components thereof in the case where remelting such as VAR, etc. is applied in the process of dissociating the magnesium oxide.

As a result of studying a size of a nitride in maraging steel, the inventors of the present application have confirmed that a size of a nitride in a steel ingot after remelting such as VAR, etc. is large as compared with that in a steel ingot after a primary melting. Then, the inventors of the present application have made sure that the cause for growth and coarsening of a nitride during remelting is that a nitride grows and is made coarse during solidification since a nitride present in a steel ingot in a primary melting is not completely melted in a molten steel during remelting.

According to the invention, crystallization or precipitation of nitrides occurs until solidification after addition of a Mg alloy, while oxides a primary component of which is MgO tends to make a nucleus for crystallization or precipitation of nitride type compounds. Owing to this, a nitride in a steel ingot in a primary melting assumes a configuration of a nitride-MgO compound, in which a nitride, for example, Ti surrounds a periphery of MgO as a nucleus of precipitation.

When Mg evaporates actively from a surface of a molten steel in the remelting process, oxides a primary component of which is MgO and constituting a part of a nitride-MgO compound is dissociated into Mg and oxygen. Therefore, the nitride-MgO compound is finely decomposed due to vanishment of a MgO part and thermal dissociation is promoted to enable completely melting a nitride in a molten steel.

Thereby, it is possible to surely melt a nitride into a molten steel to prevent the nitride from being not entirely melted and growing into a further large nitride to become coarse, with the result that it is possible to obtain a steel ingot free of any coarse nitride.

Specifically, in the case where remelting is VAR or the like, in which a unit of solidification is small, growth of nitride inclusions, which are not entirely melted in remelting, causes an important problem, and the invention provides effective measures for solving the problem.

Elements that form nitride inclusions typically include Ti mentioned, and further Al, Nb, V, Cr, etc. as other elements.

In the invention, it is important to control an ambient atmosphere of a molten metal as described above. While dissociation proceeds when pressure is reduced in the process of dissociating the magnesium oxide relative to that in the magnesium oxide forming process, a range preferred in a mass production technology is such that a degree of vacuum in the magnesium oxide forming process is 6 kPa to 60 kPa and a degree of vacuum in the process of dissociating the magnesium oxide is reduced relative to 0.6 kPa.

Here, the reason why a lower limit of the degree of vacuum in the magnesium oxide forming process is made 60 kPa is that a fundamental outgassing action cannot be expected at a high pressure than the lower limit. Also, the reason why an upper limit is made 6 kPa is that in a pressure reduced ambient atmosphere exceeding the upper limit, Mg vaporizes before being diffused into a molten metal and oxides a primary component of which is MgO is hard to form, so that the effect of the invention becomes indefinite.

Also, while the degree of vacuum in the process of dissociating the magnesium oxide is favorably a pressure reduced ambient atmosphere as far as possible, this is not practical since the dissociation reaction proceeds slowly at a pressure over 0.6 kPa, so that it is preferable to reduce pressure relative to 0.6 kPa. 0.06 kPa or less is more preferable.

As described above, in determining those conditions, under which an oxide in a molten steel is made oxides a primary component of which is MgO, there are a method of calculation in a chemical equilibrium manner, and a method of experimentarily finding such conditions while collecting samples.

Specifically, in the case where Al is problematic as inclusions, the relationship between an amount of Mg ($Mg_{OXI}$) and an amount of Al ($Al_{OXI}$) is preferably adjusted in the magnesium oxide forming process so as to meet $Al_{OXI}$ (mass ppm)/$Mg_{OXI}$ (mass ppm)=5 to 100.

The reason for this is that since Mg is higher in oxide forming ability than Al, an oxide in a molten steel can be made oxides a primary component of which is MgO with $Al_{OXI}$ (mass ppm)/$Mg_{OXI}$ (mass ppm)=around 100, and an oxide in a molten steel can be further surely made oxides a primary component of which is MgO in a range of at least $Al_{OXI}$ (mass ppm)/$Mg_{OXI}$ (mass ppm)=5.

While this effect can be produced to not a little extent in a range of at most $Al_{OXI}$ (mass ppm)/$Mg_{OXI}$ (mass ppm)=200, Mg becomes excessive and a value of $Al_{OXI}$ (mass ppm)/$Mg_{OXI}$ (mass ppm) become less than 5, which is not preferable because there is a possibility that inclusions are conversely increased.

For maraging steel, to which VAR is applied, and tool steel such as steel for metal molds, etc. it is preferred that a Mg alloy of 10 to 100 ppm in an amount corresponding to Mg be added to a molten steel in a primary melting and Mg be decreased to 5 ppm or less in a steel ingot after remelting.

Desirably, Al is positively added not as impurities of steel but as a target component in a steel ingot and applied to a kind of steel, in which inclusions are liable to generate, for example, a kind of steel, in which inclusions of 0.1 to 6 mass % are contained. Here, the reason why the upper limit value is made 6 mass % is based on a recognition that around 6% is an upper limit value for general purpose materials.

Also, application to a kind of steel containing Ti of 0.1 to 2 mass % is possible.

As described above, effectiveness is found specifically in the case where remelting is applied. The reason why the upper limit value is made 2 mass % is that an upper limit value of an amount of Ti contained in a general purpose steel is around 2%. In addition, even when less than the lower limit value and more than the lower limit value, the effect of the invention is demonstrated to not a little extent.

Practical types of steel, to which the invention is applied, include maraging steel. Recently, in particular, there has been an application that a power transmission belt for automobiles is made of a thin strip of maraging steel having a thickness of about not more than 0.2 mm. In uses, in which a steel finally has a thickness of not more than 0.5 mm, there is a risk that oxides having a size exceeding, for example, 15 μm becomes an initiation point of high-cycle fatigue fracture, and so it is necessary to make oxides in a material to have a size of not more than 15 μm.

Also, since maraging steel except only a part thereof contains Ti as a component, TiN is present in a steel ingot. Since TiN is rectangular in shape and susceptible to stress concentration and forms a hydrogen embrittlement region called a dark area, it is higher in susceptibility to high-cycle fatigue fracture than an oxide and it is said that TiN in a material be needed to be equal to or less than 10 μm. Therefore, the kind of steel is suited to the manufacturing method of the invention.

An example of maraging steel applied to the invention will be described below.

Maraging steel is an alloy, as suggested by its name, of which a very high strength around 2000 Mpa and an excellent ductility are obtained by subjecting a martensitic structure to ageing (age hardening treatment), and which contains Ni of 8 to 25 mass %, the steel being an age hardened type super strength steel.

A preferred chemical composition (mass %) of maraging steel is as follows.

O (oxygen) is an element that forms oxide inclusions. According to the invention, it is possible to control oxide inclusions to make the same very fine, and it is further desirable to decrease an amount of oxygen that forms the oxide inclusions.

N (nitrogen) is an element that forms nitrides and carbonitrides inclusions. According to the invention, it is possible to control nitride inclusions to make the same very fine, and it is further desirable to decrease an amount of nitrogen that forms the nitride inclusions. Therefore, it is preferable to limit N to less than 15 ppm.

C (carbon) forms carbides or a carbonitrides, and an upper limit of C is preferably 0.01% or less in order to decrease a precipitated amount of an intermetallic compound to reduce the fatigue strength.

Ti is an indispensable element and forms a fine intermetallic compound which is precipitated by ageing treatment to contribute to strengthening of the steel, and it is desirably preferable to contain Ti of not less than 0.3%. Since deterioration in ductility and toughness is resulted when its content exceeds 2.0%, a Ti content is preferably not more than 0.2%.

Ni is an indispensable element that forms a parent structure having a high toughness. When the Ni content is less than 8.0%, however, toughness is degraded. On the other hand, when the Ni content exceeds 22%, an austenite phase is stabilized and it becomes difficult to form a martensitic structure, so that the Ni content is preferably 8.0 to 22.0%.

Co is an element which contributes to precipitation strengthening of the steel by lowering the solid solubility of Mo in a matrix without greatly affecting the stability of the matrix of a martensitic structure whereby promoting Mo to form a fine intermetallic compound which is precipitated in the matrix. With its content less than 5.0%, however, an adequate effect is not necessarily obtained, and with its content exceeding 20.0%, there is shown a tendency of embrittlement, so that the Co content is preferably 5.0 to 20.0%.

Mo is an element that forms a fine intermetallic compound by means of aging treatment and brings about precipitation in a matrix to contribute to strengthening. With its content less than 2.0%, however, its effect is less, and with its content exceeding 9.0%, it is liable to form a coarse precipitate, so that the Mo content is preferably 2.0 to 9.0%.

Since Al not only contributes to precipitation strengthening of the steel by aging treatment but also causes a deoxidation reaction, its content is preferably not less than 0.01%, but its content in excess 1.7% causes deterioration in toughness, so that its content is preferably not more than 1.7%.

The remainder except the elements described above may be composed of Fe but, for example, B is an element effective in making crystal grains fine, so that it may be contained in the range of 0.01% or less, which range causes no deterioration in toughness.

Also, unavoidably contained impurity elements are contained.

Since Si and Mn among these elements promote precipitation of a coarse intermetallic compound, which brings about embrittlement, to cause a decrease in ductility and toughness and to form non-metallic inclusions to cause a decrease in fatigue strength, Si and Mn are preferably not more than 0.1% in content, respectively, desirably not more than 0.05%, and since P and S also make grain boundary embrittle and form non-metallic inclusions to cause a decrease in fatigue strength, they are preferably not more than 0.01%, respectively.

Also, further practical types of steel, to which the invention is applied, include a steel for metal molds for resin.

Surfaces of resin products molded by a metal mold for resin are needed to be free of flaw in terms of outward appearance. Also, the presence of inclusions exceeding appropriately 10 μm to be disposed on surfaces of metal mold molding portions of a metal mold for compact disks, DVD, or resin lenses is responsible for pin hole disadvantages.

Accordingly, it is said that an oxide or nitrides present in materials be needed to be equal to or less than 10 μm. Application of the invention is very effective in ingotting a tool steel such as steel for metal molds for resin, etc.

A steel of molds for resin molding, to which the invention is suitably applied, may contain indispensable components, for example, 0.005 to 0.5% of C (carbon), 0.2 to 3.0% of Mn, 0.1 to 2.0% of Si, 1.5 to 4% of Ni, and 0.1 to 2.0% of Al, and optionally one or more selected from the group of 3 to 8% of Cr, 0.3 to 3.5% of Cu, 0.1 to 3% of W and/or Mo in term of (W/2+Mo), not more than 0.3% of S (sulfur), not more than 2% of Co, not more than 0.5% of Nb, and not more than 0.5% of V.

In addition, while the balance is composed of Fe and unavoidable impurities, N (nitrogen) and O (oxygen), which form inclusions, are preferably 0.01% or less in content and machinability improving elements may be contained in a total of about 1% in addition to the elements described above.

Alloys having the composition in the range described above exemplarily contain the alloy composition described in, for example, JP Patent No. 3351766, JP Patent No. 2879930, and JP-59-37738-B2.

EXAMPLE 1

First, an example of maraging steel applied first to the invention will be described below as an embodiment.

A consumable electrode of 1 ton for VAR melting, in which a Mg content in molten steel was in the order of non-addition to 200 ppm and varied in six kinds, was produced by VIM for a representative component of maraging steel (see No. 1 to No. 6 in TABLE 1).

A primary melting electrode for VAR was produced in VIM by adding Mg included a 95 mass % Ni-5 mass % Mg alloy to a molten steel at the degree of vacuum of 13.3 kPa and then solidifying the molten steel in a mold. Also, a consumable electrode was also produced as a comparative material under the condition of Mg micro-addition or non-addition by VIM.

Further, in order to elucidate influences on nitrides or carbonitrides by addition of Mg, six consumable electrodes, of which nitrogen concentration was adjusted to 5 ppm and 10 ppm, were produced and subjected to VAR (see No. 7 to No. 12 in TABLE 1).

Steel ingots were produced by using VAR under the same conditions to remelt these electrodes produced by VIM. The same molds, respectively, were used in VAR, and melting was performed at the degree of vacuum of 1.3 Pa with a making current being 6.5 kA at a stationary portion of a steel ingot.

TABLE 1 indicates consumable electrodes produced by VIM and the chemical composition of steel ingots obtained by vacuum-remelting the electrodes by VAR. No. 7 to No. 12 demonstrate influences on nitrides or carbonitrides by addition of Mg.

In addition, the consumable electrodes are indicated as "electrode" and the consumable electrodes after VAR are indicated as "steel ingot".

Also, a value of "electrode" corresponds to a value in a step of formation of a Magnesium oxide, and a value of "steel ingot" corresponds to a value in a step of dissociation in the invention.

TABLE 1

| No. | | C | Ni | Co | Mo | Ti | Al | N | O | Mg | Al ppm/Mg ppm | Remarks (mass %) |
|---|---|---|---|---|---|---|---|---|---|---|---|---|
| 1 | Electrode | 0.004 | 18.2 | 9.5 | 4.9 | 0.45 | 0.11 | 0.0014 | 0.0005 | 0.0045 | 24.4 | Invention specimen |
|   | Steel ingot | 0.004 | 18.2 | 9.5 | 4.9 | 0.45 | 0.11 | 0.0007 | 0.0005 | 0.0001 | — | |
| 2 | Electrode | 0.004 | 18.3 | 9.5 | 5.0 | 0.47 | 0.13 | 0.0010 | 0.0006 | 0.0017 | 76.4 | Invention specimen |
|   | Steel ingot | 0.004 | 18.3 | 9.5 | 5.0 | 0.47 | 0.13 | 0.0008 | 0.0005 | 0.0001 | — | |
| 3 | Electrode | 0.003 | 18.3 | 9.4 | 5.0 | 0.46 | 0.14 | 0.0013 | 0.0004 | 0.0014 | 100 | Invention specimen |
|   | Steel ingot | 0.003 | 18.3 | 9.4 | 5.0 | 0.46 | 0.14 | 0.0007 | 0.0005 | 0.0002 | — | |
| 4 | Electrode | 0.004 | 18.2 | 9.4 | 5.0 | 0.45 | 0.13 | 0.0011 | 0.0005 | 0.0020 | 65.0 | Invention specimen |
|   | Steel ingot | 0.004 | 18.2 | 9.4 | 5.0 | 0.45 | 0.13 | 0.0007 | 0.0004 | 0.0002 | — | |

TABLE 1-continued (mass %)

| No. | | C | Ni | Co | Mo | Ti | Al | N | O | Mg | Al ppm/Mg ppm | Remarks |
|---|---|---|---|---|---|---|---|---|---|---|---|---|
| 5 | Electrode | 0.004 | 18.2 | 9.4 | 5.0 | 0.49 | 0.12 | 0.0012 | 0.0008 | 0.0004 | 300 | Comparative specimen |
| | Steel ingot | 0.004 | 18.2 | 9.4 | 5.0 | 0.49 | 0.12 | 0.0008 | 0.0005 | 0.0003 | — | |
| 6 | Electrode | 0.004 | 18.3 | 9.5 | 4.9 | 0.45 | 0.13 | 0.0013 | 0.0007 | 0.0003 | 433 | Comparative specimen |
| | Steel ingot | 0.004 | 18.3 | 9.5 | 4.9 | 0.45 | 0.13 | 0.0007 | 0.0005 | 0.0001 | — | |
| 7 | Electrode | 0.005 | 18.4 | 9.2 | 5.5 | 0.44 | 0.13 | 0.0005 | 0.0005 | 0.0029 | 44.8 | Invention specimen |
| | Steel ingot | 0.004 | 18.3 | 9.2 | 5.5 | 0.44 | 0.13 | 0.0005 | 0.0005 | 0.0005 | — | |
| 8 | Electrode | 0.003 | 17.9 | 9.3 | 5.3 | 0.47 | 0.10 | 0.0005 | 0.0006 | 0.0012 | 83.3 | Invention specimen |
| | Steel ingot | 0.002 | 17.9 | 9.2 | 5.3 | 0.47 | 0.10 | 0.0005 | 0.0005 | 0.0001 | — | |
| 9 | Electrode | 0.005 | 18.1 | 8.9 | 5.1 | 0.49 | 0.12 | 0.0010 | 0.0004 | 0.0048 | 25.0 | Invention specimen |
| | Steel ingot | 0.004 | 18.1 | 8.9 | 5.0 | 0.48 | 0.12 | 0.0009 | 0.0004 | 0.0011 | — | |
| 10 | Electrode | 0.003 | 18.3 | 9.4 | 4.9 | 0.46 | 0.12 | 0.0010 | 0.0005 | 0.0017 | 70.6 | Invention specimen |
| | Steel ingot | 0.003 | 18.3 | 9.5 | 5.0 | 0.46 | 0.11 | 0.0009 | 0.0004 | 0.0003 | — | |
| 11 | Electrode | 0.005 | 18.3 | 9.2 | 5.1 | 0.46 | 0.13 | 0.0005 | 0.0006 | 0.0002 | 650 | Comparative specimen |
| | Steel ingot | 0.004 | 18.3 | 9.2 | 5.0 | 0.45 | 0.13 | 0.0005 | 0.0004 | 0.0002 | — | |
| 12 | Electrode | 0.004 | 18.0 | 9.3 | 5.3 | 0.44 | 0.12 | 0.0010 | 0.0004 | 0.0003 | 400 | Comparative specimen |
| | Steel ingot | 0.003 | 18.1 | 9.2 | 5.3 | 0.44 | 0.13 | 0.0009 | 0.0003 | 0.0001 | — | |

First, test pieces for observation of inclusions were collected from "electrode" and the inclusion was examined.

Inclusions were confirmed in two kinds of methods, and a cross-sectional configuration of the inclusion was observed by cutting down blocks from "electrode" and performing electron microscopic observation of a cross section. Exemplarily, FIGS. 1a, 1b, and 1c (in the figures, a plurality of substantially square spots are aligned linearly in a right and lower portion of each of photographs to indicate dimensions. That is, a distance between spots positioned at both ends of the plurality of spots indicates a numeric value 5 μm written down together. The same is the case with the remaining figures.) show several electron micrographs of typical nitride inclusions out of inclusions collected from an invention specimen No. 2.

Figure 2:
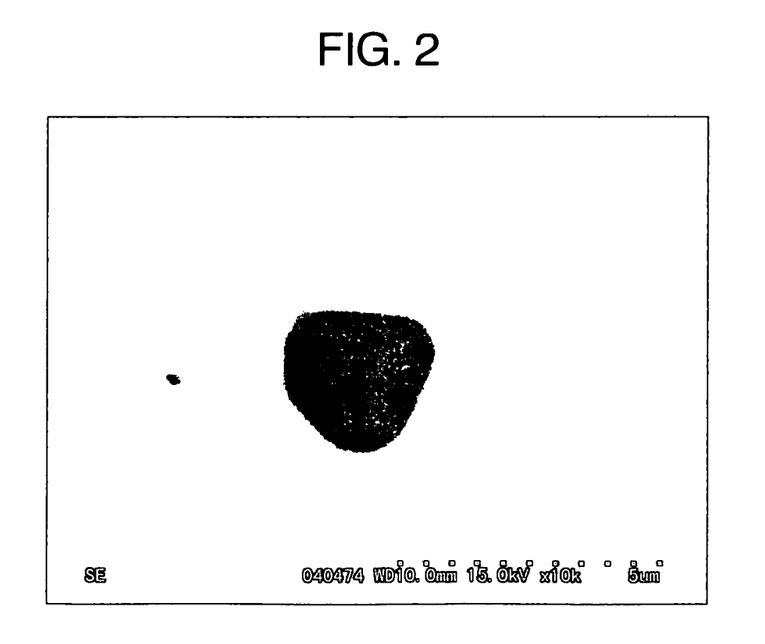
FIG. 2 is a section electron micrograph indicative of nitride inclusions found in maraging steel "electrode" produced by a comparative method.

On the other hand, blocks were cut down from "electrode" of a comparative specimen No. 5 and electron microscopic observation of cross sections of the blocks was performed. Exemplarily, FIG. 2 shows an electron micrograph of a typical nitride inclusion.

It is seen from FIGS. 1a to 1c and FIG. 2 that inclusions, to which the method according to the invention is applied, assumes the form, in which a relatively large MgO as a nucleus is surrounded by TiN.

Figure 1A:
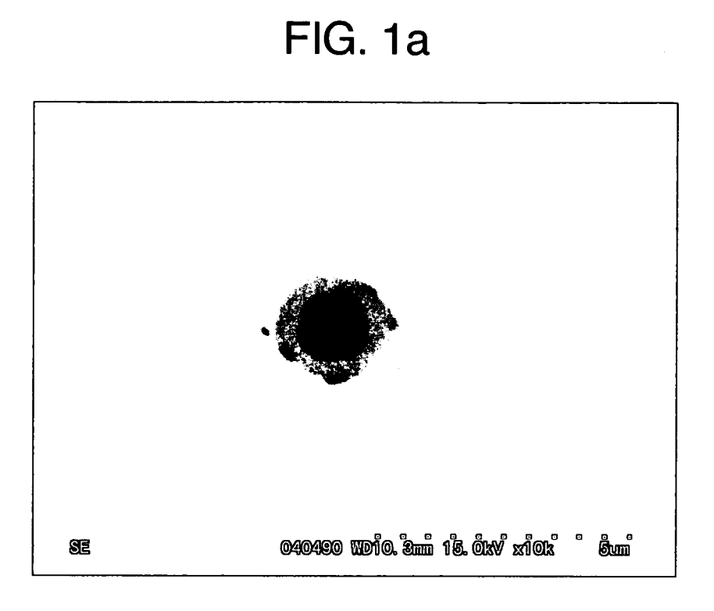
FIG. 1a is a section electron micrograph indicative of nitride inclusions found in maraging steel "electrode" produced by a method of the invention.
Figure 1B:
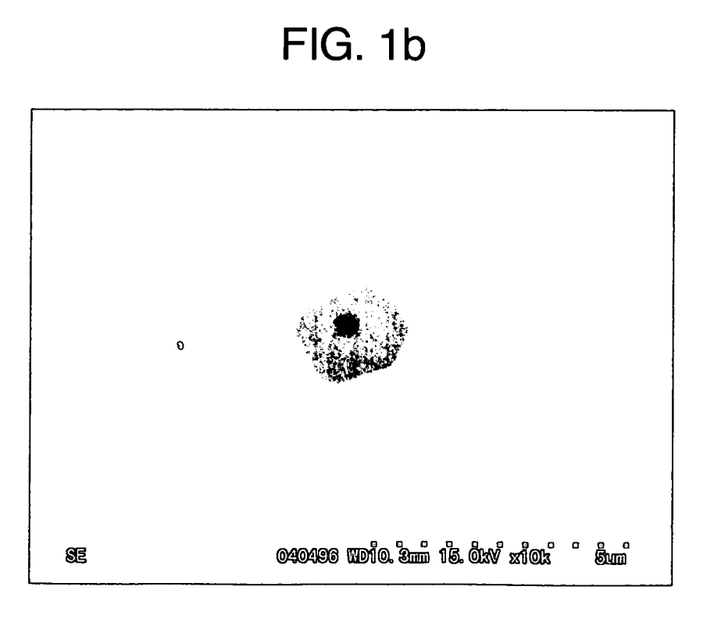
FIG. 1b is a section electron micrograph indicative of further nitride inclusions found in maraging steel "electrode" produced by the method of the invention.
Figure 1C:
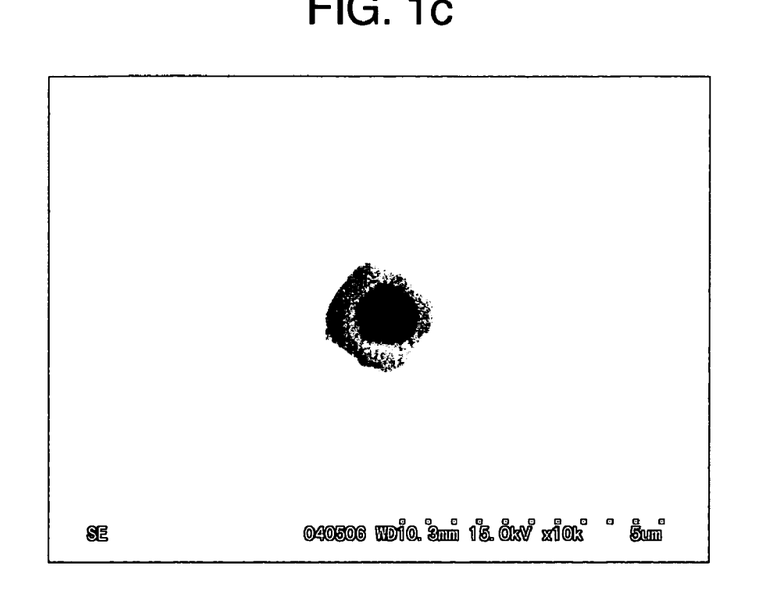
FIG. 1c is a section electron micrograph indicative of further nitride inclusions found in maraging steel "electrode" produced by the method of the invention.

In addition, many nitride inclusions, in which MgO was present as a nucleus in a relatively large area ratio, could be seen in "electrode", to which the method according to the invention was applied, as shown in FIGS. 1a to 1c. This tendency is thought to be peculiar to inclusions, to which the method according to the invention is applied.

A method of examining a ratio of inclusions mainly composed of MgO adopts one of collecting ten test pieces having a weight of 1 g from "electrode" and using the EBBM (Electron Beam Button Melting) method to heat and melt sample metallic pieces to make the same metallic balls to examine inclusions having a relatively small specific gravity and floating on surfaces of the metallic balls.

In addition, since the larger in weight the samples, the more correct the measurements, and a lot of time is needed for an operation of confirmation, a total of 10 g was collected because it is practical to make an examination with samples having a weight of necessity minimum.

Subsequently, those inclusions having a magnitude of at least 5 μm, out of oxide inclusions caused by the EBBM method to float on surfaces of metallic balls were subjected one by one to quantitative analysis in an energy distributed type X-ray analyzer, and it was confirmed that inclusions mainly composed of MgO amounted to 80% of the total.

Figure 3A:
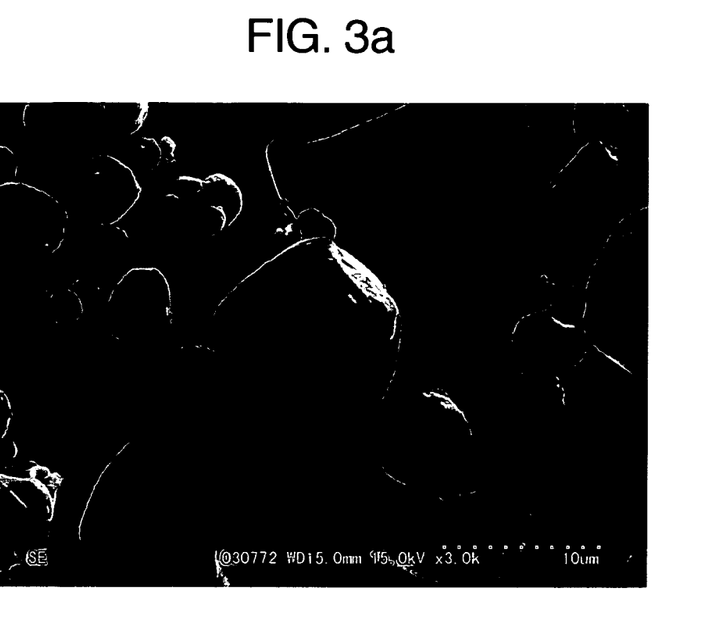
FIG. 3a is a section electron micrograph indicative of MgO type inclusions extracted from maraging steel "electrode" produced by the method of the invention.
Figure 3B:
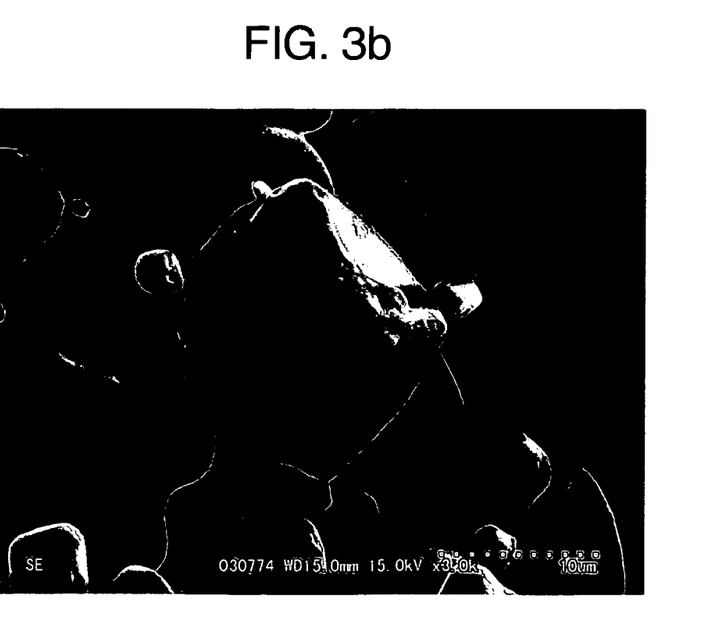
FIG. 3b is a section electron micrograph indicative of MgO type inclusions extracted from maraging steel "electrode" produced by the method of the invention.
Figure 4A:
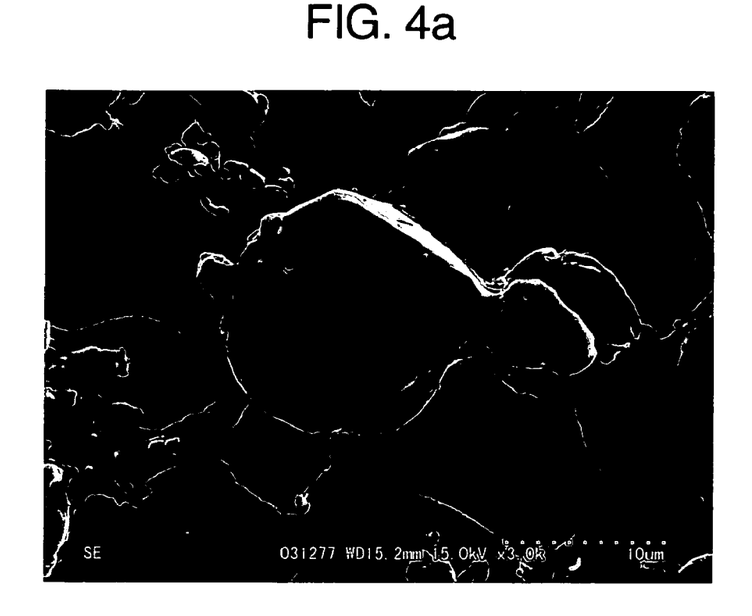
FIG. 4a is a section electron micrograph indicative of $Al_2O_3$ inclusions extracted from maraging steel "electrode" produced by the comparative method.
Figure 4B:
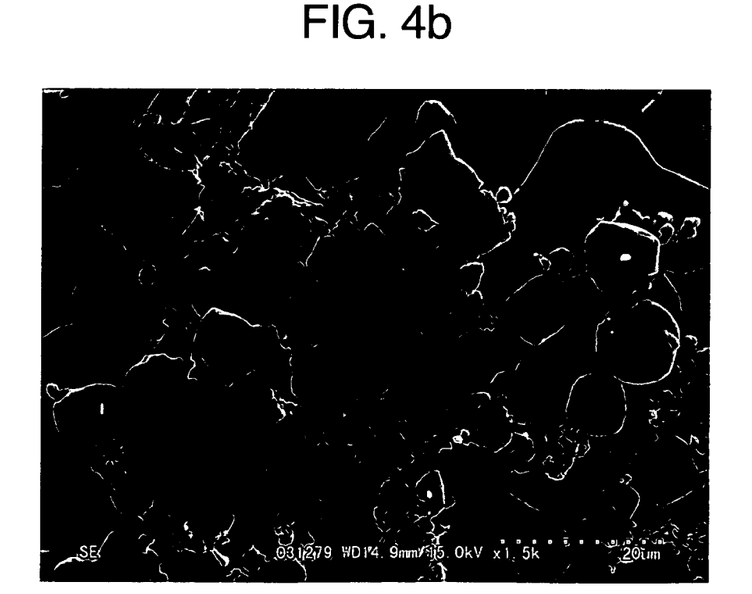
FIG. 4b is a section electron micrograph indicative of "MgO—$Al_2O_3$" type inclusions extracted from maraging steel "electrode" produced by the comparative method.

FIGS. 3a, 3b, 4a, and 4b show electron micrographs of inclusions extracted by the EBBM method. FIGS. 3a and 3b show inclusions of the MgO type according to the invention, and FIG. 4 shows comparative examples, FIGS. 4a and 4b showing inclusions, in which $Al_2O_3$ agglomerates, and FIG. 4b showing inclusions of spinel "$MgO—Al_2O_3$".

Subsequently, steel ingots after VAR were subjected to soaking of 1250° C.×20 hours, and then subjected to hot forging to provide hot forgings.

Subsequently, these materials were subjected to hot rolling, solution heat treatment of 820° C.×1 hour, cold rolling, solution heat treatment of 820° C.×1 hour, and aging treatment of 480° C.×5 hour to manufacture maraging steel strips having a thickness of 0.5 mm.

Transverse samples were collected from both ends of maraging steel strips of No. 1 to No. 6, dissolved by a mixed acid solution, and filtered by a filter, a residue remaining on the filter and composed of an oxide was observed by SEM, and the composition and size of oxide non-metallic inclusions were measured.

In measuring the size of the non-metallic inclusions, a diameter of a circle circumscribing the non-metallic inclusions was assumed to provide a maximum length of the non-metallic inclusions. The results are indicated in TABLE 2.

TABLE 2

| No. | Rate of alumina type inclusions with a size of 10 μm or more | Maximum length (μm) of non-metallic oxide inclusions | Remarks |
|---|---|---|---|
| 1 | 66.7% | 16.0 | Invention specimen |
| 2 | 16.7% | 14.1 | Invention specimen |
| 3 | 0% | 12.8 | Invention specimen |
| 4 | 0% | 12.5 | Invention specimen |
| 5 | 82.9% | 22.4 | Comparative specimen |
| 6 | 73.5% | 21.1 | Comparative specimen |

(*Note: Here, alumina type inclusions mean spinel ($MgO—Al_2O_3$) and $Al_2O_3$.)

TABLE 2 indicates a tendency that oxide non-metallic inclusions exceeding 20 μm disappear from maraging steel in lots, in which a value of a steel ingot Mg becomes equal to or less than 50% of an amount corresponding to an added Mg, and the larger an electrode Mg content, the smaller a size of the inclusions.

maximum length of the nitrides. In addition, a diameter of a circle circumscribing oxide non-metallic inclusions was likewise assumed to provide a maximum length of the non-metallic inclusions. The results are indicated in TABLE 3.

TABLE 3

| No. | Electrode nitrogen (ppm) | Rate of alumina type inclusions with a size of 10 μm or more | Maximum length (μm) of non-metallic oxide inclusions | maximum length (μm) of non-metallic nitride inclusions | Remarks |
| --- | --- | --- | --- | --- | --- |
| 7 | 5 | 0 | 11.0 | 3.4 | Invention specimen |
| 8 | 5 | 15% | 14.1 | 4.3 | Invention specimen |
| 9 | 10 | 0% | 9.8 | 6.8 | Invention specimen |
| 10 | 10 | 0% | 10.6 | 7.1 | Invention specimen |
| 11 | 5 | 85% | 21.6 | 6.2 | Comparative specimen |
| 12 | 10 | 79% | 23.2 | 10.7 | Comparative specimen |

Also, oxide non-metallic inclusions in steel ingots observed in this evaluation were composed of a spinel (MgO—Al$_2$O$_3$) oxide inclusion and oxides a primary component of which is MgO in the invention, and oxides a primary component of which is Al$_2$O$_3$ in the comparative examples.

In addition, the reason why oxide inclusions of "electrode" changed to a spinel oxide inclusion after remelting in the invention is that MgO present in the electrode evaporated, or a part of MgO having not evaporated was decomposed into Mg and O to make a spinel oxide inclusion or remained slightly as MgO.

It is thought that newly generated spinel oxide inclusions of (MgO—Al$_2$O$_3$) during remelting under vacuum made fine inclusions of 20 μm or less owing to an effect of a decrease in electrode oxygen concentration by addition of Mg, and evaporation of Mg during melting under vacuum, and even newly generated inclusions as Al$_2$O$_3$ inclusions made inclusions of 20 μm or less owing to a decrease in Oxygen quantity.

Figure 5A:
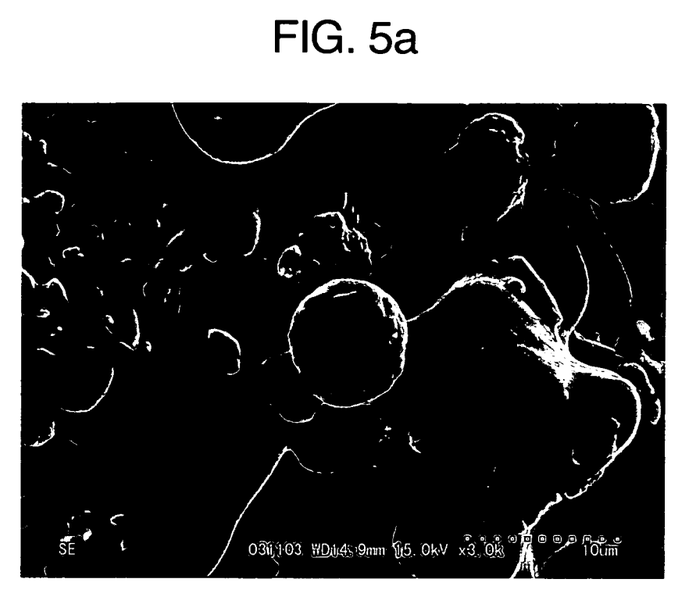
FIG. 5a is a section electron micrograph indicative of oxide inclusions found in a steel strip sample obtained by subjecting maraging steel "steel ingot" produced by the method of the invention to hot rolling, solution heat treatment, cold rolling, and aging treatment.
Figure 5B:
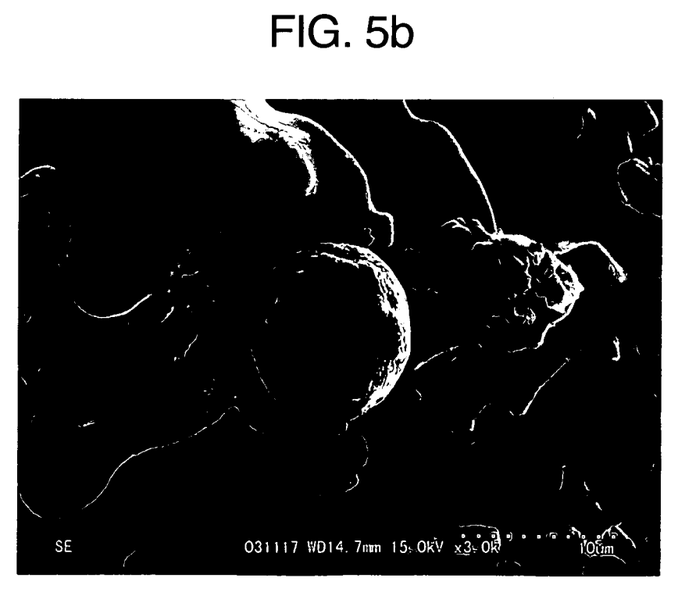
FIG. 5b is a section electron micrograph indicative of oxide inclusions found in a steel strip sample obtained by subjecting maraging steel "steel ingot" produced by the method of the invention to hot rolling, solution heat treatment, cold rolling, and aging treatment.
Figure 5C:
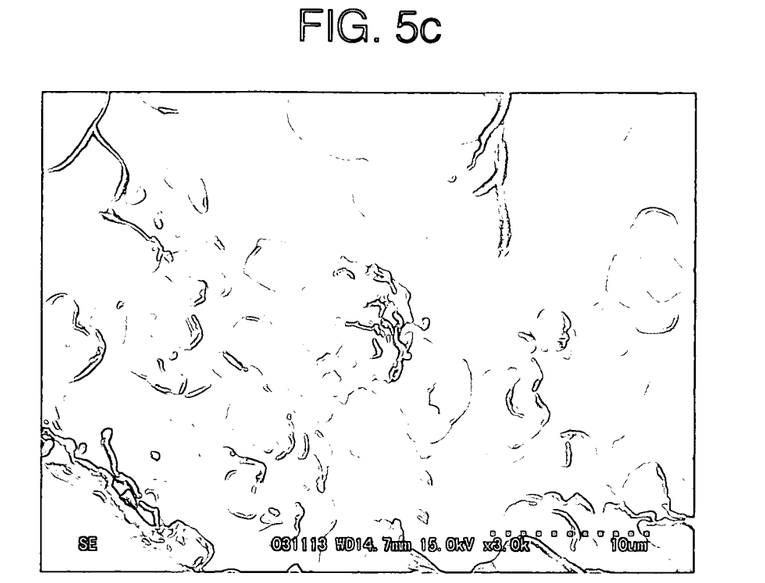
FIG. 5c is a section electron micrograph indicative of oxide inclusions found in a steel strip sample obtained by subjecting maraging steel "steel ingot" produced by the method of the invention to hot rolling, solution heat treatment, cold rolling, and aging treatment.

FIGS. 5a, 5b, and 5c show electron micrographs of typical oxide inclusions according to the invention. FIG. 5a shows MgO inclusions, FIG. 5b shows spinel oxide inclusions of (MgO—Al$_2$O$_3$), and FIG. 5c shows an aggregate of Al$_2$O$_3$ inclusions.

Figure 6A:
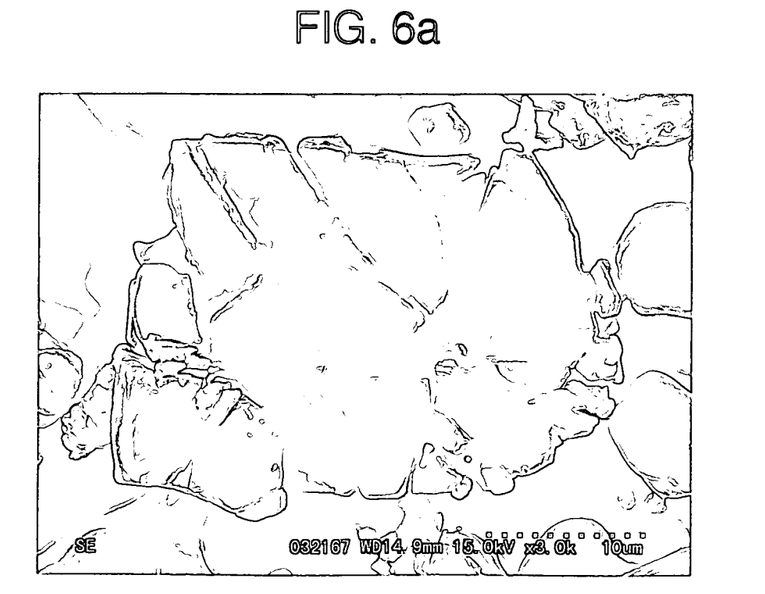
FIG. 6a is a section electron micrograph indicative of oxide inclusions found in a steel strip sample obtained by subjecting maraging steel "steel ingot" produced by the comparative method to hot rolling, solution heat treatment, cold rolling, and aging treatment.
Figure 6B:
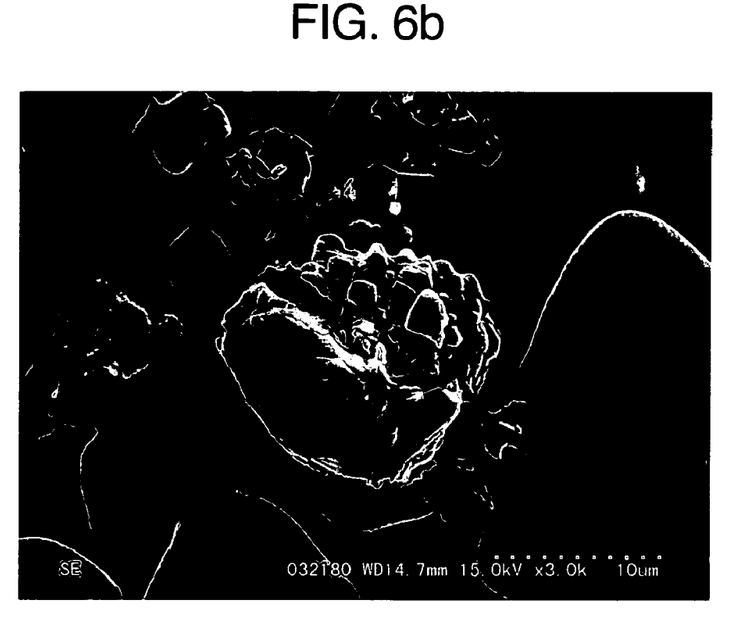
FIG. 6b is a section electron micrograph indicative of oxide inclusions found in a steel strip sample obtained by subjecting maraging steel "steel ingot" produced by the comparative method to hot rolling, solution heat treatment, cold rolling, and aging treatment.

FIGS. 6a and 6b show electron micrographs of typical oxide inclusions in comparative examples, FIG. 6a showing Al$_2$O$_3$ inclusions, and FIG. 6b showing spinel oxide inclusions of (MgO—Al$_2$O$_3$), these inclusions being large as compared with inclusions in the invention. In addition, according to the embodiment, the samples in steel strips having a thickness of 0.5 mm were used for examination of inclusions, and any change in the configuration, composition, and size of inclusions were not specifically found as compared with the stage of "steel ingot".

Subsequently, transverse samples of 100 g were collected from both ends of maraging steel strips of No. 7 to No. 12, dissolved by a mixed acid solution, a bromine methanol, or the like, and then filtered by a filter, a residue remaining on the filter and composed of an oxide was observed by SEM, and the size of oxide non-metallic inclusions was measured.

Further, in order to evaluate nitrides and carbonitrides in detail, inclusions of 10 g were collected, dissolved by a mixed acid solution, a bromine methanol, or the like, nitrides and carbonitrides were increased in degree of cluster by decreasing the filtration area of the filter, and SEM was used to observe nitrides the number of which is 10,000 and carbonitrides to measure a maximum size.

Since nitrides or the like were rectangular-shaped, a major side a and a minor side b were measured, and a diameter of a circle corresponding to an area a×b was assumed to provide a It is found with respect to oxides from TABLE 3 that like results of examination in No. 1 to No. 6 shown in TABLE 2, oxide non-metallic inclusions exceeding 20 μm disappear from maraging steel strips in lots, in which a value of a steel ingot Mg becomes equal to or less than 50% of an amount corresponding to an added Mg. Also, it is found with respect to a maximum length of an nitride, etc. that when the electrode nitrogen concentration is 5 ppm, an nitride, etc. is made more fine by 2 to 3 μm in size due to addition of Mg, and when the electrode nitrogen concentration is 10 ppm, an nitride, etc. is made more fine by 3 to 4 μm in size due to addition of Mg.

Figure 7:
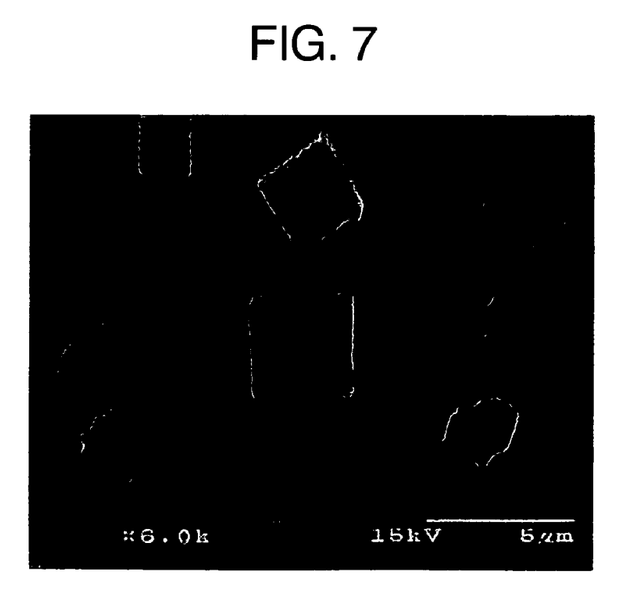
FIG. 7 is a section electron micrograph indicative of nitride inclusions found in a steel strip sample obtained by subjecting maraging steel "steel ingot" produced by the method of the invention to hot rolling, solution heat treatment, cold rolling, and aging treatment.
Figure 8:
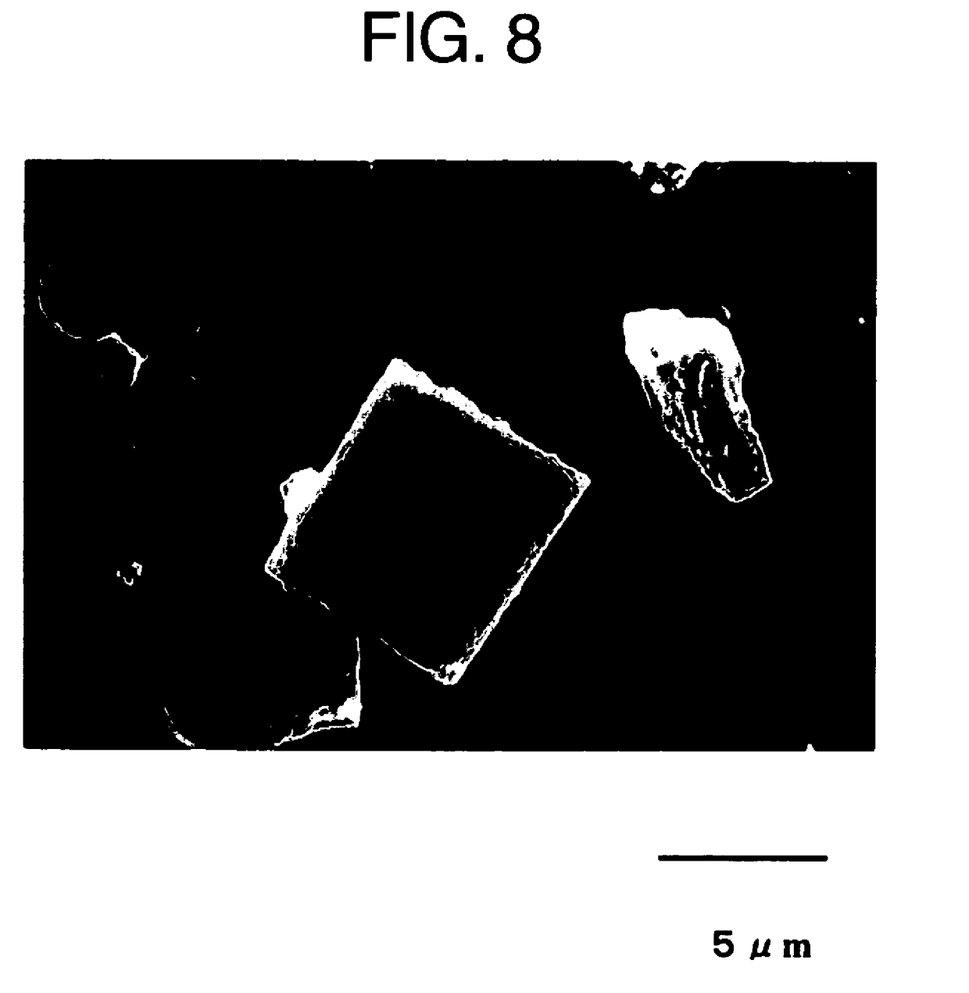
FIG. 8 is a section electron micrograph indicative of nitride inclusions found in a steel strip sample obtained by subjecting maraging steel "steel ingot" produced by the comparative method to hot rolling, solution heat treatment, cold rolling, and aging treatment.

FIG. 7 shows an electron micrograph of nitride inclusions of an invention specimen No. 8, and FIG. 8 shows an electron micrograph of nitride inclusions of a comparative specimen No. 11.

Subsequently, samples for fatigue tests were collected from "electrode" described above.

The samples were obtained by performing soaking of 1250° C.×20 hours on test pieces of an invention specimen No. 7 and a comparative specimen No. 11, and then performing hot forging on them to provide bars having a diameter of 15 mm. Subsequently, after the bars were subjected to solution heat treatment of 820° C.×0.5 hours, aging treatment of 480° C.×3 hours was performed on them to fabricate 10 ultrasonic fatigue test pieces for the specimen No. 7 and the comparative specimen No. 11, respectively.

An ultrasonic fatigue testing machine was used to put the ultrasonic fatigue test pieces to fatigue test at the stress amplitude of 400 MPa. The fatigue test was carried out such that the duration of operation at a speed of vibration of 20 kHz was 80 ms and stoppage for cooling was 190 ms, and repeated until the test piece was broken. As a result of observing a fracture initiation point of the broken test piece, it was confirmed that a fatigue crack developed in the test piece with inclusions as the fracture initiation point and resulted in fracture.

Figure 9:
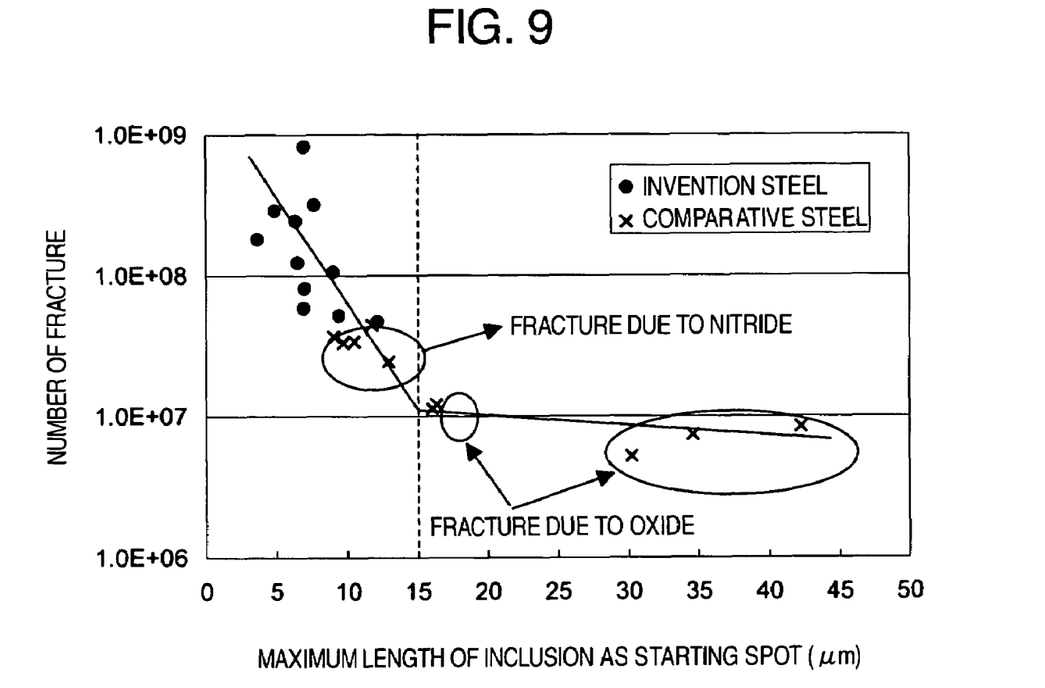
FIG. 9 is a graph showing results of fatigue tests on maraging steel obtained in the method of the invention and the comparative method.

Hereupon, with respect to those test pieces, in which inclusions provided the fracture initiation point, maximum lengths of the inclusions were measured by SEM observation. FIG. 9 shows a plot of the number of repetitions of a fatigue test at the time of fracture vs. a maximum length of those inclusions, which provided the fracture initiation point.

It is seen from FIG. 9 that when a maximum length of those inclusions, which provided the fracture initiation point, exceeded approximately 15 μm for oxides and approximately 10 μm for nitrides, the rupture life amounted to around $10^7$ times and when a maximum length of those inclusions, which provided the fracture initiation point, was approximately 15 μm or less for oxides and approximately 10 μm or less for nitrides, the rupture life was extremely extended to amount to $10^8$ times or more as a maximum length of the inclusions was decreased.

While the average rupture life of the invention specimen No. 7 was as long as $10^8$ times or more, the average rupture life of the comparative specimen No. 11 amounted to $10^7$ times, and thus it was confirmed that making inclusions fine according to the invention was apparently effective in extending the fatigue life.

EMBODIMENT 2

An example of steel for metal molds for resin, applied to the invention will be described below.

Since inclusions in structure of steel for metal molds for resin are modified into a spinel ($MgO$—$Al_2O_3$) oxide or oxides a primary component of which is MgO, it is possible to provide a metal mold steel, which is free of any pin hole flaw and excellent in polishing property as described above.

First, VIM was made use of to ingot a 1 ton consumable electrode (the balance: Fe and unavoidable impurities) having the composition of TABLE 4, in which a Mg content in molten steel was non-addition to about 200 ppm and a Mg content was adjusted, for representative components of metal molds for resin.

In VIM, a Ni—Mg alloy added Mg to the molten steel at the degree of vacuum of 13.3 kPa, and thereafter solidification was made in a casting mold to manufacture a primary melting electrode for VAR.

Also, a consumable electrode was produced as a comparative material under the conditions of addition of a very small amount of Mg or non-addition by means of VIM.

The electrodes produced by means of VIM were remelted under the same conditions by VAR to manufacture steel ingots. The same casting molds were used in VAR, and melting was made at the degree of vacuum of 1.3 kPa with a making current being 6.5 kA at a stationary portion of a steel ingot.

The steel ingots thus obtained were forged and rolled to slabs having a section size of 400 mm×50 mm and subjected to heat treatment, and test pieces of 50 mm×50 mm were cut out from a center in a slab width direction to be adjusted to a martensitic structure having a predetermined harness to provide sample materials. Here, the heat treatment was carried out so as to provide for a hardness of 40HRC±5 such that quenching was made by making heating at 1000° C. for 1 hour and then making air cooling, and thereafter tempering was made by making heating at an appropriate temperature of 520° C. to 580° C. at intervals of 20° C. for 1 hour and then making air cooling.

TABLE 4

(mass %)

| No. | | C | Si | Mn | Cr | Ni | Al | Cu | N | O | Mg | Al ppm/ Mg ppm | Remarks |
|---|---|---|---|---|---|---|---|---|---|---|---|---|---|
| 1 | Electrode | 0.030 | 0.29 | 0.32 | 6.01 | 3.00 | 0.80 | 1.50 | 0.0015 | 0.0012 | 0.0080 | 100 | Invention specimen |
|   | Steel ingot | 0.029 | 0.29 | 0.32 | 6.01 | 3.00 | 0.80 | 1.50 | 0.0009 | 0.0006 | 0.0002 | — | |
| 2 | Electrode | 0.031 | 0.28 | 0.31 | 5.13 | 3.03 | 0.85 | 1.45 | 0.0016 | 0.0011 | 0.0099 | 85.8 | Invention specimen |
|   | Steel ingot | 0.031 | 0.28 | 0.30 | 5.13 | 3.03 | 0.85 | 1.45 | 0.0008 | 0.0005 | 0.0003 | — | |
| 3 | Electrode | 0.029 | 0.29 | 0.29 | 5.03 | 3.02 | 0.90 | 1.52 | 0.0009 | 0.0005 | 0.0092 | 97.8 | Invention specimen |
|   | Steel ingot | 0.029 | 0.29 | 0.29 | 5.03 | 3.02 | 0.90 | 1.52 | 0.0006 | 0.0004 | 0.0002 | — | |
| 4 | Electrode | 0.030 | 0.29 | 0.32 | 6.01 | 3.00 | 0.75 | 1.50 | 0.0015 | 0.0013 | 0.0102 | 73.5 | Invention specimen |
|   | Steel ingot | 0.030 | 0.29 | 0.32 | 6.01 | 3.00 | 0.75 | 1.50 | 0.0008 | 0.0005 | 0.0002 | — | |
| 5 | Electrode | 0.031 | 0.30 | 0.32 | 6.50 | 3.56 | 0.82 | 1.48 | 0.0015 | 0.0020 | 0.0002 | 4100 | Comparative specimen |
|   | Steel ingot | 0.031 | 0.30 | 0.32 | 6.50 | 3.56 | 0.82 | 1.48 | 0.0008 | 0.0010 | 0.0002 | — | |
| 6 | Electrode | 0.030 | 0.32 | 0.32 | 3.95 | 3.42 | 0.87 | 1.50 | 0.0021 | 0.0005 | 0.0004 | 2175 | Comparative specimen |
|   | Steel ingot | 0.030 | 0.32 | 0.32 | 3.95 | 3.42 | 0.87 | 1.50 | 0.0009 | 0.0003 | 0.0003 | — | |

Size of inclusions and the polishing property were evaluated for these sample materials. For inclusions, samples of respective TP were dissolved by the same acid extract treatment as that for the maraging steel and lengths of inclusions obtained by filtration through a filter were observed by SEM.

The polishing property was evaluated by making mirror finish of the sample materials in #3000 level and #6000 level with a grinder→paper→diamond compound system and counting the number of fine pits as generated with the use of a magnifier having a magnifying power of 10.

Evaluation criteria in an examined area of 2500 $mm^2$ were represented by "A" for the number of pits of less than 4, "B" for the number of pits of 4 to less than 7, "C" for the number of pits of 7 to less than 10, and "D" for the number of pits of 10 or more. TABLE 5 indicates results of the evaluation.

TABLE 5

| No. | Hardness (HRC) | Maximum length (μm) of inclusions | Polishing property #3000 | #6000 | Remarks |
|---|---|---|---|---|---|
| 1 | 38.2 | 9.5 | B | B | Invention specimen |
| 2 | 38.5 | 7.8 | A | A | Invention specimen |
| 3 | 39.1 | 8.1 | A | A | Invention specimen |
| 4 | 39.1 | 9.2 | A | A | Invention specimen |
| 11 | 41.2 | 15.5 | D | D | Comparative specimen |
| 12 | 39.8 | 13.2 | C | C | Comparative specimen |

It could be confirmed from results of TABLE 5 that the materials according to the invention were apparently effective for an excellent polishing property of metal molds for resin.

INDUSTRIAL APPLICABILITY

The invention is capable of finely diffusing non-metallic inclusions existent in a steel ingot and effective as a method of generally manufacturing steel, in which sizes of inclusions cause a problem, in addition to maraging steel, in which high-cycle fatigue strength causes a problem, metal mold steel, in which inclusions cause a problem in mirror polishing property, etc.

The invention claimed is:

1. A method of producing a steel ingot, which comprises the steps of:
   preparing molten steel under vacuum;
   forming magnesium oxides by adding Mg into the molten steel in order to make oxides contained in the molten steel so as to have a chemical composition a primary component of which is MgO;
   subsequently producing a consumable electrode from the molten steel containing magnesium oxides; and
   remelting the consumable electrode under higher vacuum than that of the former process of forming the magnesium oxides in order to dissociate the magnesium oxides contained in the molten steel into Mg and oxygen, thereby making a Mg content in the molten steel to be not more than 50% of that in the former process of forming magnesium oxides.

2. The method according to claim 1 wherein the remelting is a vacuum arc remelting.

3. The method according to claim 1, wherein the steel ingot contains a nitride forming element as a component of the steel.

4. The method according to claim 1, wherein the degree of vacuum in the first step of forming a magnesium oxide is 6 kPa to 60 kPa and the degree of vacuum in the second step of the remelting process is lowered to less than 0.6 kPa.

5. The method according to claim 1, wherein the relationship between an amount of Mg ($Mg_{OXI}$) and an amount of Al ($Al_{OXI}$) is adjusted in the first step of forming a magnesium oxide so as to meet the following equation:

$$Al_{OXI}(\text{mass ppm})/Mg_{OXI}(\text{mass ppm}) = 5 \text{ to } 100.$$

6. The method according to claim 1, wherein Mg is added into the molten steel as a Ni—Mg alloy which contains from exclusive zero to not more than 20 mass % of Mg.

7. The method according to claim 1, wherein the steel ingot contains 0.01 to 6 mass % of Al.

8. The method according to claim 1, wherein the steel ingot contains 0.1 to 2 mass % of Ti.

9. The method according to claim 1, wherein the steel ingot is of a maraging steel.

10. The method according to claim 1, wherein the steel ingot is of a tool steel.

11. The method according to claim 9, wherein the maraging steel consists essentially of, by mass, less than 10 ppm of O (oxygen), less than 15 ppm of N (nitrogen), not more than 0.01% C, 0.3 to 2.0% or less of Ti, 8.0 to 22.0% of Ni, 5.0 to 20.0% of Co, 2.0 to 9.0% of Mo, 0.01 to 1.7% of Al, and the balancer of Fe and unavoidable impurities.

12. The method according to claim 1, wherein an amount of the additive Mg in the magnesium oxide forming process is not more than 10 to 200 ppm.

13. The method according to claim 1, wherein the steel is a maraging steel, and wherein a maraging steel ingot obtained after the remelting process contains oxide type nonmetallic inclusions having a maximum length of not more than 16.0 μm, and an amount of $Al_2O_3$ type oxide inclusions to a total the number of oxide inclusions having a size of not less than 10 μtm is not more than 66.7%.

14. The method according to claim 1, wherein the steel is a maraging steel, and wherein a maraging steel ingot obtained after the remelting process contains nitride type nonmetallic inclusions having a maximum length of not more than 10 μm.

15. The method according to claim 1, wherein a maraging steel ingot obtained after the remelting process is used as a raw material of a power transmission belt of automobiles, which has a thickness of not more than 0.5 mm.

* * * * *